United States Patent [19]

Goodwin

[11] 3,994,292

[45] Nov. 30, 1976

[54] CHICK PROCESSING SYSTEM

[76] Inventor: Ray Goodwin, Rte. 3, Kenly, N.C. 27252

[22] Filed: Aug. 11, 1975

[21] Appl. No.: 603,458

[52] U.S. Cl. .............................. 128/172; 128/253; 119/22; 209/125; 302/2 R
[51] Int. Cl.² ................... A61M 35/00; A01K 45/00
[58] Field of Search ............ 128/173 R, 172 R, 187, 128/213 R, 214 R, 223, 303.1, 186, 253; 119/22; 209/124, 125; 302/2 R

[56] References Cited
UNITED STATES PATENTS

| | | | |
|---|---|---|---|
| 3,147,845 | 9/1964 | Harrison et al. | 209/125 |
| 3,557,685 | 1/1971 | Schroering | 209/125 |
| 3,570,487 | 3/1971 | Reynolds | 128/223 |
| 3,704,688 | 12/1972 | Wilson | 128/253 |
| 3,777,752 | 12/1973 | Goodwin | 128/173 R |

*Primary Examiner*—Robert W. Michell
*Assistant Examiner*—Henry J. Recla
*Attorney, Agent, or Firm*—Pierce, Scheffler & Parker

[57] ABSTRACT

An improved system for processing baby chicks so that they may receive necessary preliminary treatment before packaging in such manner as to reduce the amount of handling, to improve the efficiency of operation and to minimize injury to the chicks. The system comprises a plurality of annular conveyors each provided with processing stations, a plurality of chute means for discharging chicks from the annular conveyors and a plurality of belt conveyors for carrying chicks to subsequent annular conveyors. During their passage along the annular conveyors, the chicks are debeaked, vaccinated and sexed.

9 Claims, 2 Drawing Figures

CHICK PROCESSING SYSTEM

In the usual operation, newly hatched chicks are removed from the incubator and collected in containers; the containers are carried to a station where the chicks are debeaked; the chicks are then collected in containers which might be those previously mentioned; the containers are then carried to another station where the chicks might be vaccinated; the chicks are then again collected in containers which might again be those previously mentioned and taken to yet another station where the chicks might be graded, sexed (i.e. sex ascertained) and counted into 100-size chick boxes. In such operation, the chicks are handled many times requiring a large amount of manual operation, and it is apparent that an arrangement which reduces the manual operation will not only produce more efficient and economical operation but also tend to reduce the amount of injury suffered by the chicks.

In attacking this problem, I initially made the invention disclosed and claimed in my patent, U.S. Pat. No. 3,777,752 dated Dec. 11, 1973. The arrangement disclosed therein was a substantial advance in the art, greatly improving efficiency of operation and reducing the injuries suffered by the chicks. The present application is an improvement on the aforementioned patent and produces a substantial improvement in processing baby chicks and in reducing the injuries which they might suffer.

It is therefore an object of this invention to provide an improved system for processing chicks. By the words "chicks" or "baby chicks" are meant newly-hatched fowls generally, including baby turkeys, baby ducks and such other fowl as may be commercially processed.

It is a further object of this invention to provide an improved system for processing chicks wherein the chicks are carried from one processing station to another with a minimum of disturbance to the chicks.

Further objects, features and advantages of this invention will be apparent from the following description when taken in conjunction with the accompanying drawings in which.

Figure 1:
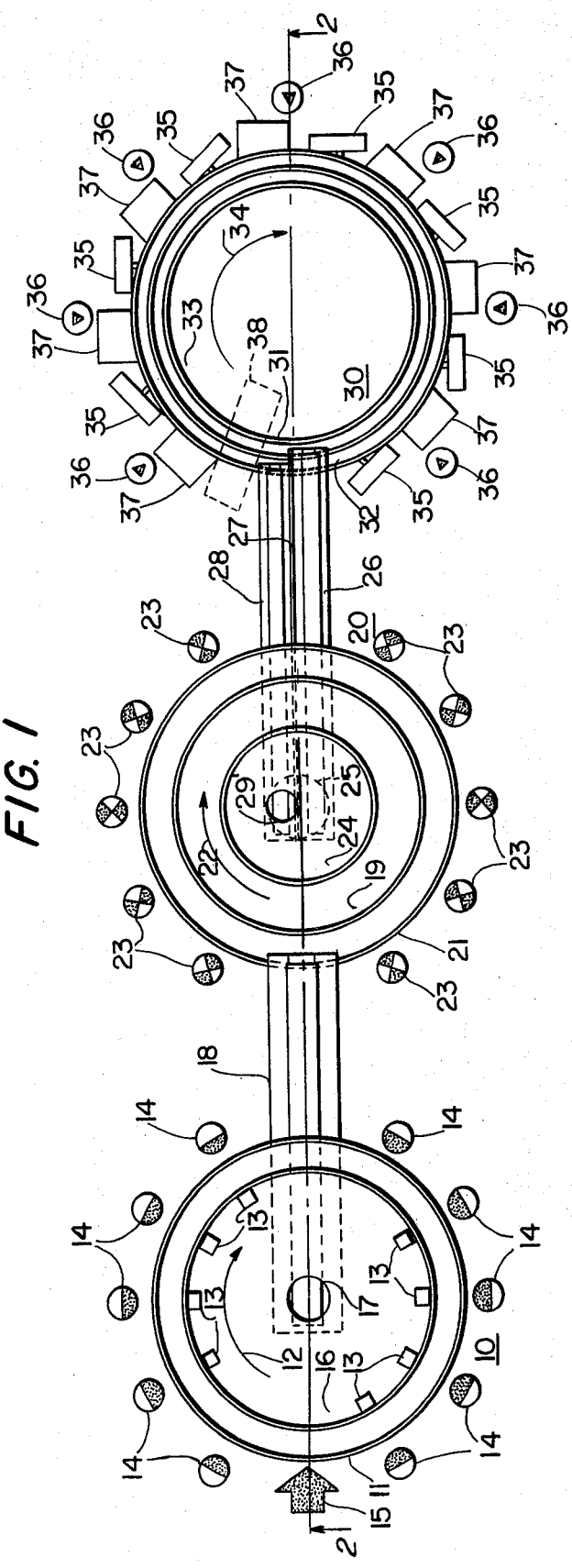
FIG. 1 is a top plan view of the system.
Figure 2:
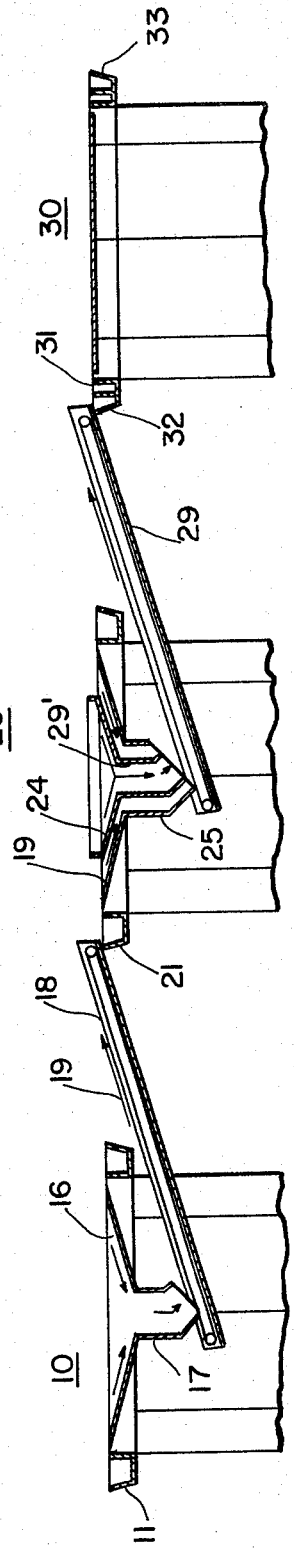
FIG. 2 is a cross-sectional view along line 2—2 of the system shown in FIG. 1.

The chick processing system of this invention illustrated in FIGS. 1 and 2, comprises three operating stations, the first being a debeaker station 10, the second being a sexing station 20 and a third being a vaccinator and packing station 30.

The debeaker station comprises a rotary annular conveyor trough 11 driven in a clockwise direction as shown by curved arrow 12 by suitable motive means (not shown). Debeaking means 13, which may be Lyon-type debeaker mechanisms, are distributed about the inner circumference of the annular conveyor trough 11, and an operator may be stationed around the conveyor 11 opposite each debeaker mechanism 13 at points 14. The chicks are loaded into the conveyor trough 11 at point 15 and are carried clockwise to pass said debeaking stations. Any operator takes a chick which is passing his station and presents the chick's beak to the debeaking mechanism.

Burning the beak tends to create some smoke. To take care of this problem, applicant may mount a plastic ell and pipe from each debeaker to a manifold unit containing an exhaust fan. This manifold is connected to a vent leading to the building exterior. An exhaust fan is on the same electrical circuit as the debeaker switch, so that it operates at all times that debeaking is being performed, but not otherwise. In addition, there may be provided a cooling system comprising a water reservoir, a recirculating pump, a supply pipe, and a return pipe, serving each debeaker. (This is optional equipment but not mandatory. Some prospective users feel that it is helpful in reducing the amount of heat in some parts of the debeaker machine with which the chick and the operator may come into contact.)

The debeaked chick is placed in conical trough 16 and passes by gravity into chute 17 to drop on upwardly inclined and driven linear belt conveyor 18 whose direction of motion is shown by arrow 19. Conveyor 18 is driven by any suitable motive means (not shown).

The chicks on conveyor belt 18 are carried upward to the sexing station 20 where they drop into a rotary annular conveyor trough 21 which is driven in a clockwise direction, as shown by curved arrow 22, by any suitable motive means (not shown). The chicks in rotary conveyor trough 21 are carried past points 23 at which sexing operators are stationed. A sexing operator removes a chick from trough 21, determines the sex of the chick and, depending on the sex of the chick, drops it into either conical trough 23 (which may be designated for males) or nested conical trough 24 (which may be designated for females). The sex of the chicks may be ascertained in one or another of a variety of ways, including examination of the cloaca or inspection of the wing feathers. The chicks in conical trough 23 pass by gravity into chute 25 and drop on portion 26 of upwardly inclined and driven conveyor 29 which is driven by any suitable motive means (not shown). Similarly, the chicks in conical trough 24 pass by gravity into chute 29' and drop on portion 28 of upwardly inclined and driven conveyor 29. Portion 27 is provided to prevent intermingling of the sexed chicks. Conveyor 29 is terminated in such manner that the chicks on portion 26, — for example, male, — are deposited in trough 31 and the chicks on portion 28, — for example, female, — are deposited in trough 32 of rotary annular conveyor 33 which is driven clockwise as shown by curved arrow 34 by any suitable motive means (not shown).

While any suitable vaccination means might be used, injection vaccination is shown in the drawing and will be described. However alternate means will be later described. Vaccinator stations 35 are spaced about the circumference of rotary annular conveyor 33 and an operator is stationed at a corresponding position 36 with respect to each of the vaccinator stations. A support 37 is placed proximate each operator position and is designed to support a chick box. Each of the operators is designated to handle chicks of a single sex and vaccinates the chicks by pressing them against the vaccinator to actuate an electrically operated needle to perform the vaccination. The vaccinated chicks are automatically counted. Each is then placed by the operator into the chick box. When the requisite number is reached, the box is removed to be replaced by an empty chick box on support 37.

It is accordingly apparent that the disclosed system results in a greatly improved and more efficient process for debeaking, sexing and vaccinating baby chicks in that the chicks are only handled in the actual operations of debeaking, sexing and vaccinating.

It is apparent that other known methods of vaccinating the chicks are used. For example, the chicks may be vaccinated by "misting" or "fogging" using Newcastle or other suitable vaccine. In this case, a fogging or misting station 38 immediately adjacent conveyor 29 may be activated. This may be a substitution for station 35, or an addition where a multiple of vaccines administerings is desired. While this arrangement might not have all the advantages of an injection vaccination, it would eliminate one handling of the chicks.

It should be noted, here, that the debeaker table may precede, or may follow, the table at which sex determination is effected; also, that the vaccination table may precede the sexing table or may follow this latter as the specific circumstances dictate.

The aforesaid debeaker means may be the debeaker means made by Lyons Electric Co. under its patents, U.S. Pat. Nos. 2,385,633, 2,359,568 or/and 3,136,315. The aforesaid injection vaccinating means may be the vaccinating means made by Zoo-Techniques, Gamblais, France, French Patent 7,215,380.

While there have been shown and described the preferred forms of embodiment of my invention, it will be apparent that various changes and modifications may be made therein without departing from the spirit of the invention as set forth in the appended claims.

I claim:
1. A chick handling and processing system comprising,
   a first rotary conveyor comprising a first annular trough-shaped member at its circumference;
   first means for moving said first rotary conveyor in one direction along a first horizontal circular path, said first annular trough-shaped member being designed to carry chicks along said circular path;
   a plurality of first positions at which a plurality of first operators can be stationed along said first circular path for processing chicks placed in said annular trough-shaped member;
   means located at each of said first positions for performing a first operation on each of said chicks;
   a downwardly extending chute means within the bounds of said first circular path, said chute means being accessible to all of said first positions and having an outlet opening at its lower end, onto which chute means the chicks which have been removed from said first annular trough-shaped member and operated on at one of said first positions are placed;
   a first travelling belt conveyor having a receiving end and a discharge end with its receiving end underlying said outlet opening, said belt conveyor receiving chicks as they move by gravity from said chute means,
   a second rotary conveyor comprising a second annular trough-shaped member at its circumference said first travelling belt conveyor discharge end overlying said second trough-shaped member thereby, discharging said chicks thereonto;
   second means for moving said second rotary conveyor in one direction along a second horizontal circular path,
   a plurality of second positions at which a plurality of second operators can be stationed along said second circular path for a second processing of said chicks placed in said second annular trough-shaped member;
   said second processing distinguishing said chicks into one of two categories;
   a downwardly extending compound chute means within the bounds of said second circular path; said compound chute means being accessible to each of said second positions and comprising an outer chute means having a first outlet opening at its lower end and an inner chute means nested within the confines of said outer chute means and having a second outlet opening at its lower end, said chicks after being categorized being placed in either of said nested chutes in accordance with the determined category;
   a divided travelling belt conveyor including a separating partition positioned centrally and longitudinally thereof, said divided travelling belt conveyor underlying both of said compound chute means in such manner that the chicks from one of said outlet means are deposited on a first area of said divided travelling belt conveyor and the chicks from the other of said outlet means are deposited on a second area of said divided travelling belt conveyor as they move by gravity off said compound chute means,
   a third rotary member comprising a first annular trough-shaped member at its circumference and a second adjacent annular trough-shaped member concentric with said first annular trough-shaped member; third means for moving said third rotary member in one direction along a third horizontal path said divided travelling belt conveyor having two separate outlet means overlying said first and second trough-shaped members of said third rotary conveyor, respectively, such that the chicks from one outlet of said separate outlet means are deposited on said first annular trough-shaped member of said third rotary conveyor and the chicks from the other outlet of said separate outlet means are deposited on said second annular trough-shaped member of said third rotary conveyor;
   a plurality of third positions at which a plurality of third operators can be stationed along said third circular path for a third processing of said chicks;
   third processing means immediately adjacent said third circular path for performing a third processing of said chicks;
   whereby a single category of chicks from a single designated one of said first and second trough-shaped members of said third rotary conveyor are selected for packaging;
   package support means adjacent each of said third positions; and
   a package on said package support for receiving a designated number of chicks.

2. A chick handling and processing system as described in claim 1, wherein said means for performing said first operation is a debeaker for removing a portion of the beaks of said chicks so that they are less able to injure one another.

3. A chick and handling system as described in claim 1, wherein the operation performed at said second position is the sexing of said chicks and the separation of said chicks into male and female categories.

4. A chick handling and processing system as described in claim 1, wherein said third processing means is vaccinating means for vaccinating said chicks against disease.

5. A chick handling and processing system as described in claim 4, wherein said vaccinating means comprises a plurality of vaccinating means each positioned adjacent each of said third positions.

6. A chick handling and processing system as described in claim 5, wherein said vaccinating means is an injection type vaccinating means.

7. A chick handling and processing means as described in claim 4, wherein said vaccinating means is a fogging or misting vaccinating means.

8. A chick handling and processing means as defined in claim 1, wherein a fogging or misting vaccinating means is operatively associated with said first travelling belt conveyor for effecting oral vaccination of chicks being carried from said downwardly extending chute means to said second rotary conveyor.

9. A chick handling and processing means as defined in claim 1, wherein a fogging or misting vaccinating means is operatively associated with said divided travelling conveyor for effecting oral vaccination of chicks whilst being carried on said divided travelling conveyor.

* * * * *